(12) United States Patent
Sano et al.

(10) Patent No.: US 11,659,149 B2
(45) Date of Patent: May 23, 2023

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yasumasa Sano, Kanagawa (JP); Satoshi Sekine, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 266 days.

(21) Appl. No.: 17/060,871

(22) Filed: Oct. 1, 2020

(65) Prior Publication Data

US 2021/0289185 A1    Sep. 16, 2021

(30) Foreign Application Priority Data

Mar. 13, 2020    (JP) .............................. JP2020-043971

(51) Int. Cl.
*G06T 7/90* (2017.01)
*H04N 9/77* (2006.01)
*H04N 9/67* (2023.01)
*H04N 23/80* (2023.01)

(52) U.S. Cl.
CPC ................. *H04N 9/77* (2013.01); *G06T 7/90* (2017.01); *H04N 9/67* (2013.01); *H04N 23/80* (2023.01); *G06T 2207/20081* (2013.01)

(58) Field of Classification Search
CPC ........ H04N 9/77; H04N 5/23229; H04N 9/67; G06T 7/90; G06T 2207/20084; G06T 2207/20081; G09G 5/02; G09G 2340/06; G06N 3/08
See application file for complete search history.

(56) References Cited

U.S. PATENT DOCUMENTS

| 8,027,060 | B2 * | 9/2011 | Kaneko | H04N 1/646 |
| | | | | 358/1.9 |
| 10,796,461 | B2 * | 10/2020 | Takasumi | H04N 1/41 |
| 11,158,286 | B2 * | 10/2021 | Yaacob | G06V 10/25 |
| 2019/0132565 | A1 | 5/2019 | Iwafuchi et al. | |
| 2019/0373232 | A1 * | 12/2019 | Brown | H04N 9/045 |
| 2022/0180485 | A1 * | 6/2022 | Chen | G06T 7/194 |

FOREIGN PATENT DOCUMENTS

| JP | 2003-69822 A | 3/2003 |
| JP | 2017-215220 A | 12/2017 |
| JP | 2019-83445 A | 5/2019 |

* cited by examiner

*Primary Examiner* — Antonio A Caschera
(74) *Attorney, Agent, or Firm* — Oliff PLC

(57) ABSTRACT

An image processing apparatus includes a processor. The processor is configured to execute a program to input, to a learning unit, capture setting information that is used to capture an image before color conversion, a lightness of a background region of the image before the color conversion, and a set of the image before the color conversion and an image after the color conversion, and prepare color conversion characteristics for performing color conversion on an image in accordance with the capture setting information and the lightness of the background region.

20 Claims, 5 Drawing Sheets

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-043971 filed Mar. 13, 2020.

BACKGROUND

(i) Technical Field

The present disclosure relates to an image processing apparatus and a non-transitory computer readable medium.

(ii) Related Art

There are an increasing number of users who capture and view digital images because of the widespread use of devices such as digital cameras, smartphones, and tablets. Various subjects are captured in the images in various environments under the influence of illumination light etc. Thus, the captured images are often different from what the users intended.

Thus, the color tint etc. of the captured images is occasionally changed.

Japanese Unexamined Patent Application Publication No. 2019-83445 describes an image processing apparatus that facilitates preparing color conversion characteristics for each capture setting information of a capture unit that captures image information. The apparatus includes: an image information acquisition unit that receives a set of image information including information on images before color conversion and information on images after color conversion; and a color conversion coefficient calculation unit that prepares color conversion characteristics for performing color conversion on an image on the basis of capture setting information set from among capture conditions at the time when the images before color conversion are captured.

SUMMARY

In the case where color conversion characteristics are prepared by learning a set of captured images and images obtained by performing color conversion on the captured images for each capture setting information, however, a contradiction may occur in the color conversion characteristics if some captured images are captured with capture setting that matches the capture environment while other captured images are not.

Aspects of non-limiting embodiments of the present disclosure relate to preparing color conversion characteristics that do not cause a contradiction in contrast to the case where color conversion characteristics are prepared using only capture setting information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor, in which the processor is configured to execute a program to input, to a learning unit, capture setting information that is used to capture an image before color conversion, a lightness of a background region of the image before the color conversion, and a set of the image before the color conversion and an image after the color conversion, and prepare color conversion characteristics for performing color conversion on an image in accordance with the capture setting information and the lightness of the background region.

BRIEF DESCRIPTION OF THE DRAWINGS

An exemplary embodiment of the present disclosure will be described in detail based on the following figures, wherein.

DETAILED DESCRIPTION

Figure 1:
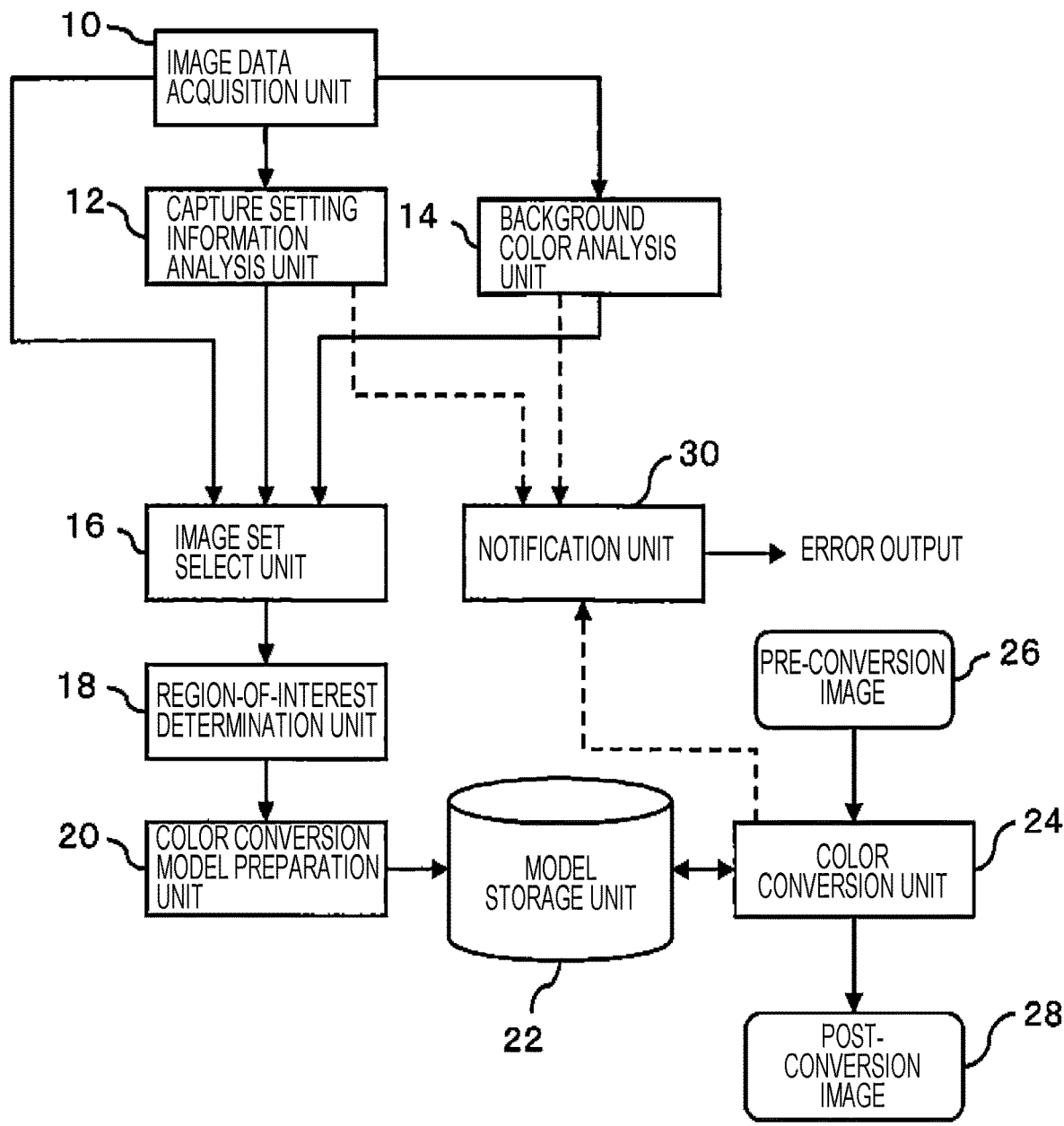
FIG. 1 is a functional block diagram of an image processing apparatus according to an exemplary embodiment.

An exemplary embodiment of the present disclosure will be described below with reference to the drawings.

<Basic Principle>

First, the basic principle will be described.

In the case where color conversion characteristics (hereinafter referred to as "color conversion models") are prepared through machine learning using a set of images such as captured images and images obtained by performing color conversion on the images, it is effective to switch the color conversion models using capture setting information.

However, it is not easy for even a skilled capturer to set the capture environment and the capture setting information to appropriate values, and captured images overexposed compared to the ideal condition and captured images underexposed compared to the ideal condition are occasionally obtained even with the same capture setting information.

The direction of color conversion may be opposite, even with the same capture setting information, since the images are overexposed compared to the ideal condition and therefore color conversion is performed so as to reduce lightness in the former case, while the images are underexposed compared to the ideal condition and therefore color conversion is performed so as to increase lightness in the latter case. Thus, when machine learning is performed using such sets of images, the precision of color conversion models obtained through the machine learning may be lowered, since there are mutually contradictory data in teacher data.

Thus, in the present exemplary embodiment, color conversion models are not simply switched using only capture setting information, but color conversion models are switched using the lightness of a captured image, more specifically the lightness of a background region of the captured image, in addition to the capture setting information, that is, using two parameters, namely the capture setting information and the lightness of the background region.

That is, teacher data are classified using two parameters, namely the capture setting information and the lightness of the background region, and a color conversion model is prepared for each of the classified teacher data. In this manner, the teacher data are classified into different data if such data are mutually different in lightness, and mutually different color conversion models are prepared, even if the data have the same capture setting information.

In executing color conversion by applying a plurality of color conversion models, which are prepared in accordance with the capture setting information and the lightness of the background region, to images to be subjected to color conversion, the capture setting information and the lightness of the images to be subjected to color conversion are analyzed, and a color conversion model that matches the capture setting information and the lightness is selected to execute color conversion.

The capture setting information as a parameter for classifying the teacher data is basically capture setting information on the original image before color conversion, but may be capture setting information on the image after color conversion. In addition, the lightness of the background region is the lightness of the background region of the original image before color conversion. The lightness of the background region is basically the average lightness of the entire background, but may be the lightness of a specific region in the background region.

<Configuration>

FIG. 1 is a functional block diagram of an image processing apparatus according to the present exemplary embodiment. The image processing apparatus includes an image data acquisition unit 10, a capture setting information analysis unit 12, a background color analysis unit 14, an image set select unit 16, a region-of-interest determination unit 18, a color conversion model preparation unit 20, a model storage unit 22, a color conversion unit 24, and a notification unit 30.

The image data acquisition unit 10 acquires an image designated by a user. The user designates a set of images before color conversion (hereinafter referred to as "pre-conversion images") and images after color conversion (hereinafter referred to as "post-conversion images") as teacher data which are necessary to prepare a color conversion model through machine learning. The image data acquisition unit 10 acquires the set of such images.

The capture setting information analysis unit 12 analyzes capture setting information from the acquired image, more specifically a pre-conversion image of the set of acquired images. The capture setting information refers to information on setting values among variables in capture conditions. The capture conditions refer to overall setting of an imaging device (camera) that is used to capture a target to be captured, and specifically include an f value (a value obtained by dividing the focal length of a lens by the effective aperture thereof, an index that indicates the brightness of a lens, or an aperture), an ISO sensitivity (an international standard that indicates the degree of weakness of light a film is capable of recording; for digital cameras, the term represents an index that indicates the degree to which light that is incident through a lens is to be amplified in the camera), a shutter speed, etc. Specific examples of the capture setting information include an f value=9 and an ISO sensitivity=100, etc., but are not limited thereto. The capture setting information analysis unit 12 analyzes the capture setting information utilizing Exif (Exchangeable image file format) information that is used as the header of image information. Examples of the Exif information include information on the f value, the ISO sensitivity, the shutter speed, etc.

The background color analysis unit 14 analyzes the lightness of the background color of the acquired image, more specifically a pre-conversion image of the set of acquired images which has been analyzed by the capture setting information analysis unit 12. Techniques of identifying the background and other portions from an image are publicly known. For example, portions with image information significantly varied from image information at the left end of the image may be determined as portions other than the background, utilizing a fact that image information on the background is substantially the same as the image information at the left end of the image. In order to sample image information to be compared with the image information at the left end of the image, pixel positions are determined at intervals determined in advance in the image, and image information is compared between pixels at the determined pixel positions and pixels at the left end of the image. Alternatively, a mask of a size determined in advance may be applied to image information, and a comparison may be made between the average value of the image information in the mask and image information on pixels at the left end of the image. Alternatively, a frequency analysis is performed on the basis of image information to acquire pixel positions at which a high frequency is generated. The acquired pixel positions constitute the contour of a portion other than the background, and therefore a portion inside the contour may be determined as a portion other than the background. Alternatively, a range with a size determined in advance from the center of the image may be prescribed, and a portion inside the range may be determined as a portion other than the background. The background color analysis unit 14 extracts the background from the image using any of the known background extraction techniques, and analyzes the lightness of the background color. The lightness of the background color may be calculated as a statistical value of the lightness of the background portion. For example, the lightness of the background color may be calculated as the average value of the lightness of a group of pixels that constitute the background portion.

The image set select unit 16 classifies the sets of pre-conversion images and post-conversion images, which are acquired by the image data acquisition unit 10, on the basis of the capture setting information, which is obtained through the analysis by the capture setting information analysis unit 12, and the lightness of the background color, which is obtained through the analysis by the background color analysis unit 14. That is, the image set select unit 16 classifies the set of pre-conversion images and post-conversion images using a two-dimensional map of the capture setting information and the lightness of the background. The image set select unit 16 sequentially selects a specific set after classifying the sets of pre-conversion images and post-conversion images.

The region-of-interest determination unit 18 determines a region of interest for the set of images which is selected by the image set select unit 16. The region of interest is a region that serves as a reference in preparing a color conversion model. While the region of interest may be set as desired, the region of interest may be a region designated by the user, or may be a specific image region set in advance. Alternatively, the region of interest may be a region in which a principal subject is present by default.

The color conversion model preparation unit 20 prepares a color conversion model by performing machine learning by inputting, to a learning unit, a set of image information on the pre-conversion image and image information on the post-conversion image in the region of interest which is determined by the region-of-interest determination unit 18, of the set of images which is selected by the image set select unit 16, as teacher data.

The "color conversion model" indicates the relationship between information on images before color conversion and information on images after color conversion. The "color conversion model" may be expressed as a function that represents the relationship between the information on images before color conversion and the information on images after color conversion. When color conversion vectors that have the information on images before color conversion as the start point and that have the information on images after color conversion as the end point are considered, the "color conversion model" is a collection of such color conversion vectors (color conversion vector group). For example, in the case where the image information is RGB data which are composed of red (R), green (G), and blue (B), and when the information on images before color conversion is defined as (Ra, Ga, Ba) and the information on images after color conversion is defined as (Rb, Gb, Bb), the "color conversion model" represents the relationship of conversion between (Ra, Ga, Ba) and (Rb, Gb, Bb). The "conversion relationship" indicates conversion information for converting the information on images before color conversion into the information on images after color conversion. The conversion relationship may be prepared as a look-up table (LUT). The LUT may be a multi-dimensional LUT, or may be a one-dimensional LUT. The conversion relationship may be prepared as a multi-dimensional matrix, rather than an LUT.

The conversion relationship is information for converting, in the case where the image information is RGB data, the information on images before color conversion (Ra, Ga, Ba) into the information on images after color conversion (Rb, Gb, Bb), i.e.

(Ra, Ga, Ba)→(Rb, Gb, Bb)

The use of this conversion relationship allows reproduction of color conversion that is similar to the color conversion performed previously. That is, when there occurs new information on images before color conversion, information on images after color conversion may be generated by performing color conversion that is similar to the color conversion performed previously by performing color conversion using the conversion relationship.

In the case where the conversion relationship is a multi-dimensional LUT, the conversion relationship is a three-dimensional LUT, and directly converts (Ra, Ga, Ba) into (Rb, Gb, Bb). That is, the conversion relationship performs the following conversion:

(Ra, Ga, Ba)→(Rb, Gb, Bb)

In the case where the conversion relationship is a one-dimensional LUT, meanwhile, the conversion relationship performs conversion for each of R, G, and B. That is, the conversion relationship performs the following conversions:

Ra→Rb
Ga→Gb
Ba→Bb

While conversion is performed in the RGB color space in the present exemplary embodiment, conversion may be performed in a different color space such as the CMYK color space. In this case, the image information is CMYK data which are composed of cyan (C), magenta (M), yellow (Y), and black (K). In the case where the conversion relationship is a multi-dimensional LUT, the conversion relationship is a four-dimensional LUT, and converts the information on images before color conversion (Ca, Ma, Ya, Ka) into the information on images after color conversion (Cb, Mb, Yb, Kb) as follows:

(Ca, Ma, Ya, Ka)→(Cb, Mb, Yb, Kb)

In the case where the conversion relationship is a one-dimensional LUT, meanwhile, the conversion relationship performs conversion for each of C, M, Y, and K. That is, the conversion relationship performs the following conversions:

Ca→Cb
Ma→Mb
Ya→Yb
Ka→Kb

The color conversion model preparation unit 20 prepares a color conversion model by inputting, to the learning unit, each set of images sequentially selected by the image set select unit 16. Thus, a color conversion model is prepared for each set of images classified in accordance with the capture setting information and the lightness of the background color. A plurality of prepared color conversion models are stored in the model storage unit 22. In the case where the color conversion model is a three-dimensional LUT, a plurality of three-dimensional LUTs are stored in the model storage unit 22. Each three-dimensional LUT is provided with a label or an ID corresponding to the capture setting information and the lightness of the background color, and stored such that a specific three-dimensional LUT may be referenced in accordance with the capture setting information and the lightness of the background color.

The color conversion unit 24 executes color conversion using the color conversion model, which is stored in the model storage unit 22, when a pre-conversion image 26 to be subjected to color conversion is input, and outputs a post-conversion image 28. The color conversion model is prepared for each set of images classified in accordance with the capture setting information and the lightness of the background. Thus, the color conversion unit 24 executes color conversion by selecting a color conversion model that matches the capture setting information and the lightness of the background of the pre-conversion image 26 to be subjected to color conversion.

The notification unit 30 outputs an error, in the case where the capture setting information analysis unit 12, the background color analysis unit 14, or the color conversion unit 24 is unable to perform processing, to notify the user accordingly. Specifically, the notification unit 30 outputs an error in the case where the capture setting information may not be acquired, in the case where the lightness of the background color may not be acquired, or the like. In addition, the notification unit 30 may output an error in the case where the background color is not a single color, since it is relatively difficult to analyze lightness in the case where the background color is not a single color.

Figure 2:
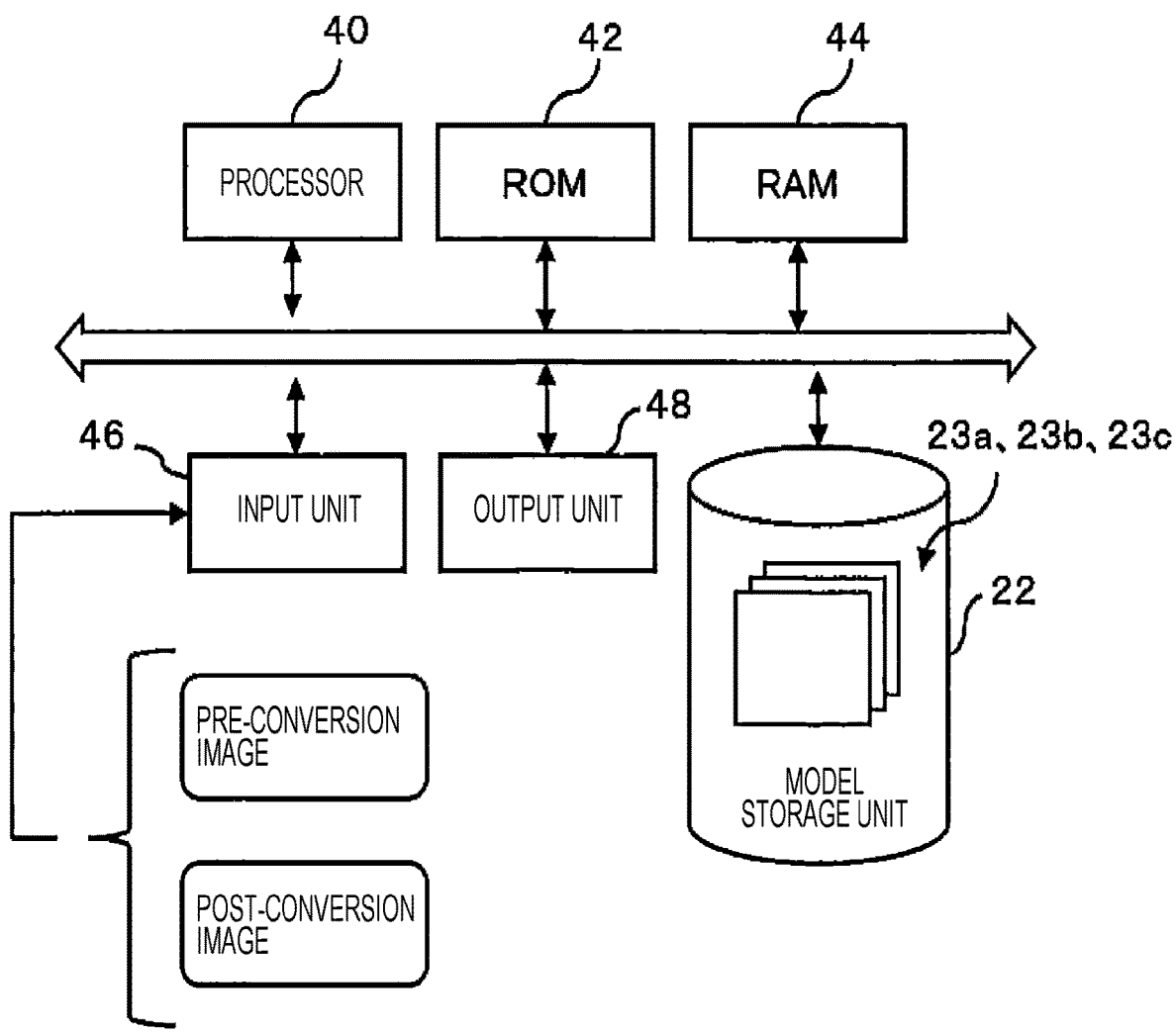
FIG. 2 is a block diagram illustrating the configuration of the image processing apparatus according to the exemplary embodiment.

FIG. 2 is a block diagram illustrating the configuration of the image processing apparatus according to the present exemplary embodiment.

The image processing apparatus is constituted of a computer, and includes a processor 40, a read only memory (ROM) 42, a random access memory (RAM) 44, an input unit 46, an output unit 48, and the model storage unit 22.

The processor 40 implements the image data acquisition unit 10, the capture setting information analysis unit 12, the background color analysis unit 14, the image set select unit 16, the region-of-interest determination unit 18, the color conversion model preparation unit 20, the color conversion unit 24, and the notification unit 30 in FIG. 1 by reading a process program stored in the ROM 42 or a different program memory and executing the process program using the RAM 44 as a work memory.

The input unit 46 is constituted from a keyboard, a scanner, a communication interface, etc., and receives sets of pre-conversion images and post-conversion images designated by the user, and receives a pre-conversion image 26 to be subjected to color conversion.

The output unit 48 is constituted of a display device etc., and outputs a post-conversion image 28 that has been subjected to color conversion by the processor 40. The output unit 48 may include a communication interface, and may output the post-conversion image 28 to a different computer via a communication line.

As discussed already, the model storage unit 22 stores a plurality of color conversion models 23a, 23b, 23c, . . . . The plurality of color conversion models 23a, 23b, 23c, . . . are each a color conversion model prepared for each of sets of images classified in accordance with the capture setting information and the lightness of the background, and are each expressed as a three-dimensional LUT, for example. The processor 40 classifies the input sets of pre-conversion images and post-conversion images in accordance with the capture setting information and the lightness of the background, and prepares a color conversion model as teacher data for each of the classified sets of images. For example, if a plurality of sets of images with the capture setting information belonging to C1 and with the lightness of the background color belonging to L1 are defined as G1, the plurality of sets of images G1 are input to the learning unit as teacher data to prepare a color conversion model 23a, and if a plurality of sets of images with the capture setting information belonging to C2 and with the lightness of the background color belonging to L2 are defined as G2, the plurality of sets of images G2 are input to the learning unit as teacher data to prepare a color conversion model 23b. The learning unit may be a neural network (NN), a convolutional neural network (CNN), etc., for example, but is not limited to a particular model.

When a pre-conversion image 26 to be subjected to color conversion is input from the input unit 46 after preparing color conversion models 23a, 23b, 23c, . . . and storing such color conversion models in the model storage unit 22, the processor 40 analyzes and acquires the capture setting information and the lightness of the background of the pre-conversion image, and reads a corresponding one of the color conversion models 23a, 23b, 23c, . . . from the model storage unit 22, performs color conversion, and outputs a converted image to the output unit 48 to be displayed.

In the present exemplary embodiment, it is not necessary that the image processing apparatus should include the model storage unit 22, and an external server etc. may include the model storage unit 22. In this case, when the processor 40 prepares color conversion models, the processor 40 stores the prepared color conversion models in the model storage unit 22 of the external server etc. via a communication interface and a communication line. In the case where a pre-conversion image 26 to be subjected to color conversion is input, the processor 40 reads a corresponding one of the color conversion models from the model storage unit 22 of the external server, and performs color conversion.

While the processor 40 prepares a color conversion model and executes color conversion using the prepared color conversion model, a processor that prepares a color conversion model and a processor that performs color conversion using the color conversion model may be separate from each other. Rather than including both a function of preparing a color conversion model and a function of executing color conversion using the color conversion model and outputting the resulting color conversion model, the image processing apparatus according to the present exemplary embodiment may include only a function of preparing a color conversion model or only a function of executing color conversion using the color conversion model and outputting the resulting color conversion model.

The processor 40 refers to hardware in a broad sense. Examples of the processor 20 include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The term "processor" is broad enough to encompass one processor or plural processors in collaboration which are located physically apart from each other but may work cooperatively.

<Process Flowchart>

Figure 3:
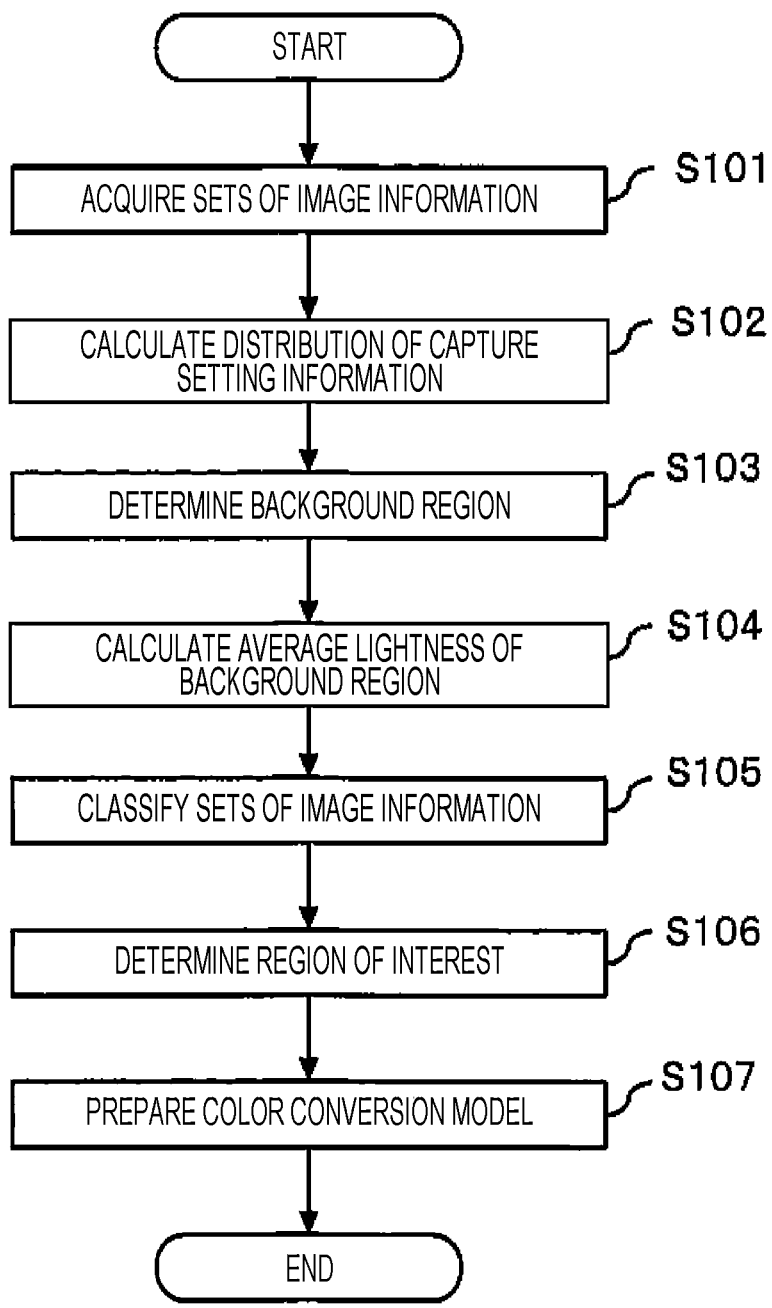
FIG. 3 is a process flowchart for the image processing apparatus according to the exemplary embodiment.

FIG. 3 is a process flowchart according to the exemplary embodiment. In particular, the drawing illustrates a process of preparing a color conversion model.

First, the processor 40 acquires sets of image information to serve as teacher data (S101). The sets of image information are sets of pre-conversion images and post-conversion images. It is desirable to acquire as many sets as possible. In addition, the acquired sets of image information may include sets of image information with the same capture setting information and that have been subjected to different color conversions.

Next, the processor 40 calculates the distribution of the capture setting information (S102). The processor 40 prepares the distribution of the number of pre-conversion images for at least one of the capture setting information. For example, the processor 40 prepares the distribution of the number of pre-conversion images for setting of the f value which is one of the capture conditions.

The horizontal axis is defined to indicate the f value, and the vertical axis is defined to indicate the number of pre-conversion images. In a certain example, the number of pre-conversion images increases as the f value increases from f1, and has a peak (maximum value) P when the f value is f2. As the f value further increases from f2, the number of pre-conversion images decreases. That is, in this case, the number of pre-conversion images may be distributed so as to have a single peak P when the f value is f2. In a different example, the number of pre-conversion images increases as the f value increases from f1, and has a first peak (maximum value) when the f value is f2. As the f value further increases from f2, the number of pre-conversion images decreases, and has a minimum value when the f value is f3. As the f value further increases from f3, the number of pre-conversion images increases, and has a second peak when the f value is f4. As the f value further increases from f4, the number of pre-conversion images decreases. That is, in this case, the number of pre-conversion images may be distributed so as to have two peaks when the f value is f2 and when the f value is f4.

Next, the processor 40 extracts the background region of the pre-conversion image (S103), and calculates the average lightness of the extracted background region (S104). While the background region may be in any color, it is desirable that the background region should be in a single color. The processor 40 calculates the average lightness in the case where the background color is a single color. In the case where the background region is not in a single color, a specific single-color region in the background region may be focused on, and the average lightness of the specific single-color region may be calculated. In the case where there are a plurality of specific single-color regions, the average lightness of a specific single-color region that occupies the largest area may be calculated, or the user may designate the position of the specific region.

Next, the processor 40 classifies the sets of image information (S105) on the basis of the distribution of the capture setting information which is calculated in S102 and the average lightness which is calculated in S104. Specifically, the distribution of the f value is adopted as the distribution of the capture setting information, and the f value is divided into four sections, namely a section F1, a section F2, a section F3, and a section F4. Meanwhile, the average lightness is classified into a section L1, a section L2, a section L3, and a section L4. The sets of image information are classified on a two-dimensional map of the capture setting information and the average lightness. Table 1 illustrates an example of the classification.

TABLE 1

|    | F1  | F2  | F3  | F4  |
|----|-----|-----|-----|-----|
| L1 | G11 | G12 | G13 | G14 |
| L2 | G21 | G22 | G23 | G24 |
| L3 | G31 | G32 | G33 | G34 |
| L4 | G41 | G42 | G43 | G44 |

G11 corresponds to sets of image information with the capture setting information on the pre-conversion image belonging to the section F1 and with the average lightness of the background region belonging to the section L1, and is composed of a plurality of sets of pre-conversion images and post-conversion images. Similarly, G12 corresponds to sets of image information with the capture setting information on the pre-conversion image belonging to the section F2 and with the average lightness of the background region belonging to the section L1, and is composed of a plurality of sets of pre-conversion images and post-conversion images. As a matter of course, the number of sections may be set as desired.

Next, the processor 40 selects a specific set from the classified sets of image information, and determines a region of interest of a pre-conversion image that constitutes the selected set (S106). A region of interest of a post-conversion image may be determined in place of a pre-conversion image that constitutes the selected set. That is, a region of interest in one of a pre-conversion image and a post-conversion image may be determined. For example, in the case where color conversion is performed for a portion of a garment as a commodity, the portion of the garment may be determined as the region of interest. It is required that the color of a commodity should be subjected to more strict color reproduction, and that the color of the actual commodity and the color of the commodity displayed as an image should coincide with each other. Therefore, the color of a commodity tends to be subjected to color conversion.

Next, the processor 40 prepares a color conversion model using pre-conversion image information and post-conversion image information in the region of interest (S107). For example, a color conversion model is prepared (S107) by selecting sets of image information that belong to G11 and performing machine learning using the sets of image information that belong to G11 as teacher data. As discussed above, a color conversion model is a function that represents the relationship between pre-conversion image information RGBa and post-conversion image information RGBb. When this function is defined as f, the relationship may be expressed as follows:

$$RGBb = f(RGBa)$$

The color conversion model may be prepared by a known learning unit. It is preferable to use a learning unit that fits well to non-linear properties such as a weighted regression model or a neural network (NN). However, linear properties which use a Matrix model may also be used, rather than non-linear properties.

The processor 40 prepares a color conversion model for each of the classified sets of image information by repeatedly executing the process in S107 for each set of image information. With reference to G11, G12, ... in Table 1, the processor 40 prepares a color conversion model 23a from the set G11 of image information, prepares a color conversion model 23b from the set G12 of image information, prepares a color conversion model 23c from the set G13 of image information, etc.

In the case where the number of sets of image information as teacher data is less than a predetermined number, preparation of color conversion models may be suspended since the model precision is not secured, and the user may be notified accordingly.

Figure 4:
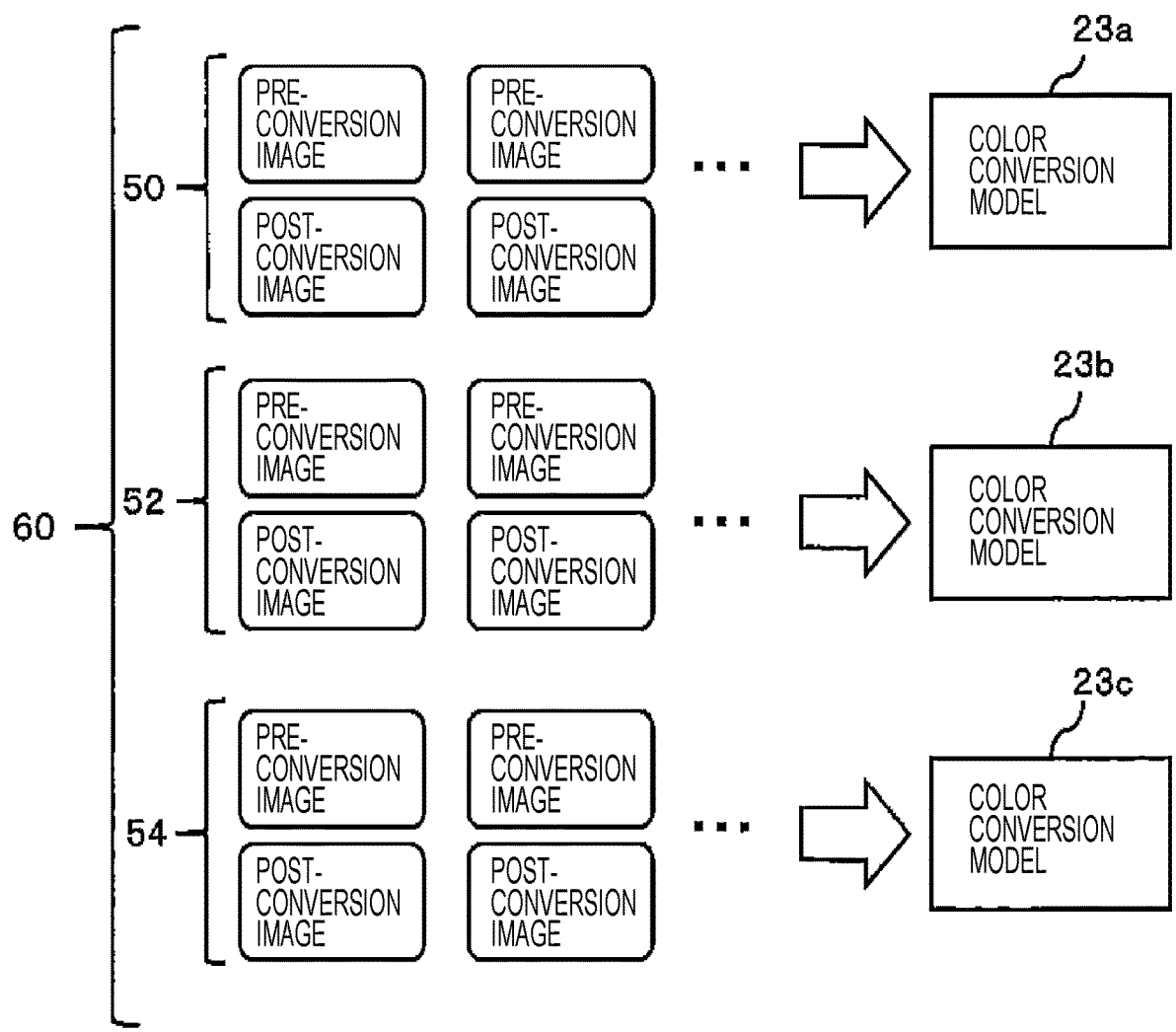
FIG. 4 illustrates preparation of color conversion models by the image processing apparatus according to the exemplary embodiment.

FIG. 4 schematically illustrates a color conversion model preparation process according to the present exemplary embodiment. A set 60 of pre-conversion images and post-conversion images is classified into a plurality of groups in accordance with the capture setting information and the lightness of the background color. A set of a plurality of pre-conversion images and post-conversion images is classified into a group 50. A set of a plurality of pre-conversion images and post-conversion images is classified into another group 52. A set of a plurality of pre-conversion images and post-conversion images is classified into still another group 54. A color conversion model 23a is prepared using the plurality of pre-conversion images and post-conversion images that belong to the group 50 as teacher data. A color conversion model 23b is prepared using the plurality of pre-conversion images and post-conversion images that belong to the group 52 as teacher data. A color conversion model 23c is prepared using the plurality of pre-conversion images and post-conversion images that belong to the group 54 as teacher data. Subsequently, a color conversion model is prepared for each group in the same manner.

By preparing a color conversion model in accordance with the capture setting information and the lightness of the background color in this manner, a color conversion process is executed, when a pre-conversion image to be subjected to color conversion is input, using a color conversion model that matches the capture setting information and the lightness of the background color of the pre-conversion image.

Figure 5:
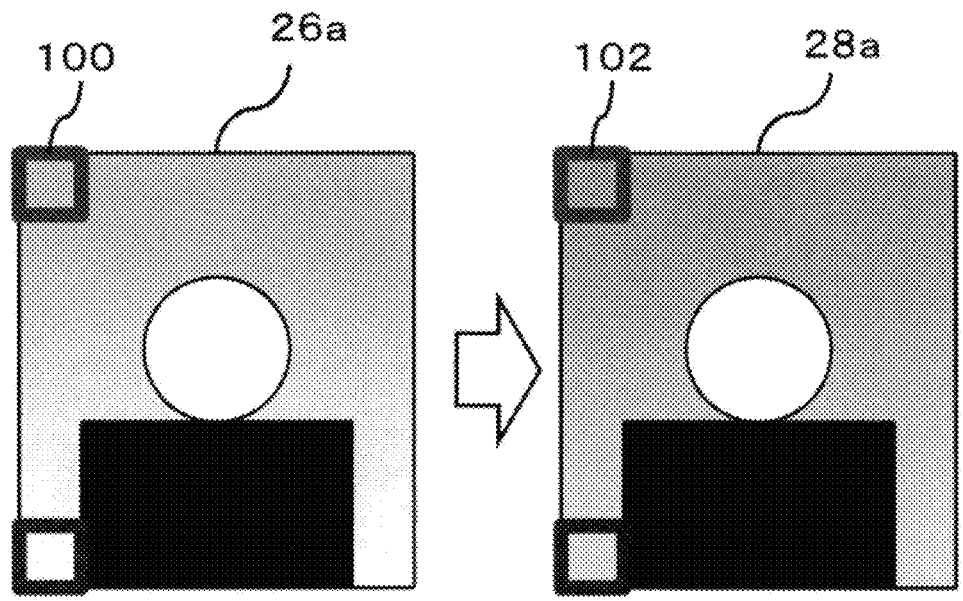
FIG. 5 illustrates a set (first set) of a pre-conversion image and a post-conversion image according to the exemplary embodiment.
Figure 6:
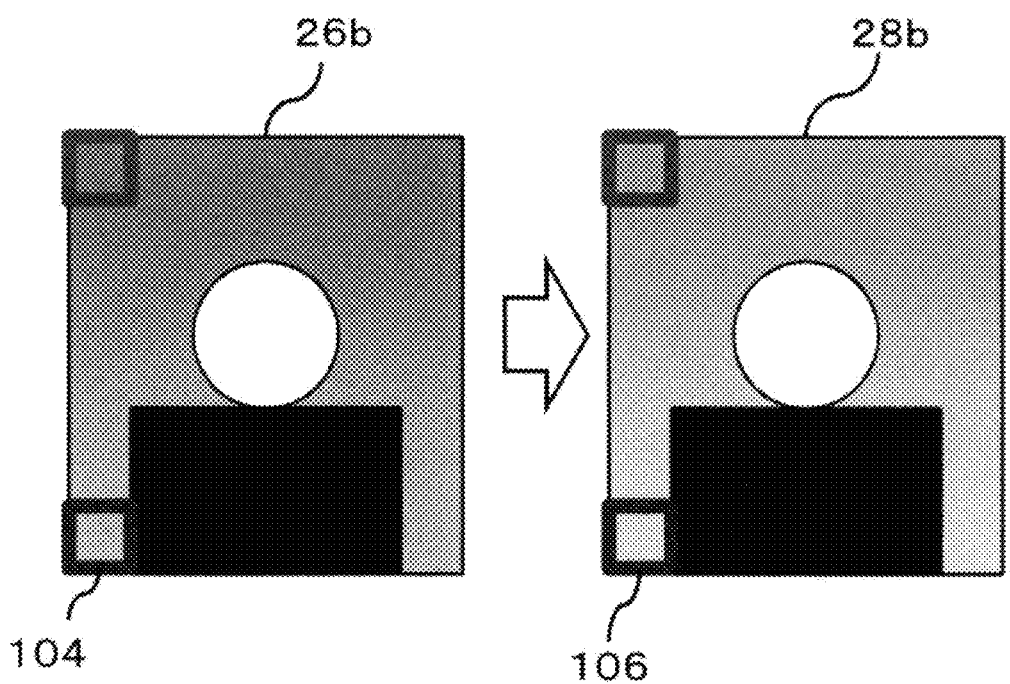
FIG. 6 illustrates a set (second set) of a pre-conversion image and a post-conversion image according to the exemplary embodiment.

FIGS. 5 and 6 illustrate examples pre-conversion images and post-conversion images. In FIG. 5, a pre-conversion image 26a is color-converted into a post-conversion image 28a by a certain operator. In FIG. 6, meanwhile, a pre-conversion image 26b is color-converted into a post-conversion image 28b by a different operator.

Focus is placed on a region 100 at the upper left corner of FIG. 5. The color of the region 100 is color-converted into the color of a region 102. Specifically, the color of the region 100 is converted such that the color of the region 102 has lower lightness than the color of the region 100. Meanwhile, focus is placed on a region 104 at the lower left corner of FIG. 6. The color of the region 104 is color-converted into the color of a region 106. Specifically, the color of the region 104 is converted such that the color of the region 106 has higher lightness than the color of the region 104.

It is assumed that the color of the region 100 in the pre-conversion image 26*a* and the color of the region 104 in the pre-conversion image 26*b* are the same as each other. Then, the direction of color conversion from the region 100 to the region 102 in FIG. 5 and the direction of color conversion from the region 104 to the region 106 in FIG. 6 are opposite to each other (the lightness is reduced in one color conversion while the light is increased in the other color conversion), even if the original color is the same. Thus, the precision of color conversion models is lowered even if learning is simply performed using the sets of images in FIGS. 5 and 6 as teacher data, since such teacher data are contradictory.

In the present exemplary embodiment, however, the sets of images in FIGS. 5 and 6 are classified in accordance with the capture setting information and the lightness of the background color. Thus, the sets of images are classified into different groups (e.g. the set of images in FIG. 5 is classified into the group 50, the set of images in FIG. 6 is classified into the group 52, etc.) since they have different lightnesses of the background color, even if the capture setting information is the same, and different color conversion models are prepared as groups with mutually different teacher data.

<First Modification>

In the present exemplary embodiment, teacher data which include a plurality of sets of pre-conversion images and post-conversion images are classified into groups in accordance with the capture setting information and the lightness of the background color, and a color conversion model is prepared for each of the groups. However, the number of sets of images in each group may be counted, and a color conversion model may be prepared for only groups having a number of sets of images, the number being equal to or more than a threshold value set in advance. In the case where the capture setting information and the lightness of the background color of an input image to be subjected to color conversion do not belong to any of the groups, for which a color conversion model has been prepared, a color conversion process may be suspended, or color conversion may be executed using a color conversion model for a group that is the closest to the capture setting information and the lightness of the background color of the input image to be subjected to color conversion.

<Second Modification>

In the present exemplary embodiment, teacher data which include a plurality of sets of pre-conversion images and post-conversion images are classified into groups in accordance with the capture setting information and the lightness of the background color. However, the teacher data may further be classified into groups using the hue of the background color. In this case, a color conversion model is prepared in accordance with the hue and the lightness of the background color, in addition to the capture setting information.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor,
wherein the processor is configured to execute a program to
input, to a learning unit, capture setting information that is used to capture an input image before color conversion, a lightness of a background region of the input image before the color conversion, and a set of images including the following: (1) the input image before the color conversion and (2) an output image generated after the color conversion on the input image, and
prepare color conversion characteristics for performing color conversion on a first image using color conversion characteristics saved in the learning unit that corresponds to both (1) capture setting information set for the first image and (2) lightness of a background region of the first image.

2. The image processing apparatus according to claim 1, wherein the processor is configured to perform color conversion using the color conversion characteristics corresponding to the input image before the color conversion, and display the image after the color conversion on a display control device.

3. The image processing apparatus according to claim 2, wherein the processor is configured to calculate a lightness of a single-color background region of the image before the color conversion.

4. The image processing apparatus according to claim 3, wherein the processor is configured to calculate a lightness of a region of interest of the background region of the image before the color conversion.

5. The image processing apparatus according to claim 4, wherein the processor is configured to prepare the color conversion characteristics in accordance with the lightness of the region of interest.

6. The image processing apparatus according to claim 3, wherein the processor is configured to group sets of images before the color conversion and images after the color conversion using the capture setting information and the lightness of the background region, and prepare the color conversion characteristics for each group.

7. The image processing apparatus according to claim 2, wherein the processor is configured to calculate a lightness of a region of interest of the background region of the image before the color conversion.

8. The image processing apparatus according to claim 7, wherein the processor is configured to prepare the color conversion characteristics in accordance with the lightness of the region of interest.

9. The image processing apparatus according to claim 2, wherein the processor is configured to group sets of images before the color conversion and images after the color conversion using the capture setting information and the lightness of the background region, and prepare the color conversion characteristics for each group.

10. The image processing apparatus according to claim 1, wherein the processor is configured to calculate a lightness of a single-color background region of the image before the color conversion.

11. The image processing apparatus according to claim 10,
wherein the processor is configured to calculate a lightness of a region of interest of the background region of the image before the color conversion.

12. The image processing apparatus according to claim 11,
wherein the processor is configured to prepare the color conversion characteristics in accordance with the lightness of the region of interest.

13. The image processing apparatus according to claim 10,
wherein the processor is configured to group sets of images before the color conversion and images after the color conversion using the capture setting information and the lightness of the background region, and prepare the color conversion characteristics for each group.

14. The image processing apparatus according to claim 1,
wherein the processor is configured to calculate a lightness of a region of interest of the background region of the image before the color conversion.

15. The image processing apparatus according to claim 14,
wherein the processor is configured to prepare the color conversion characteristics in accordance with the lightness of the region of interest.

16. The image processing apparatus according to claim 4,
wherein the processor is configured to group sets of images before the color conversion and images after the color conversion using the capture setting information and the lightness of the background region, and prepare the color conversion characteristics for each group.

17. The image processing apparatus according to claim 1,
wherein the processor classifies teacher data in accordance with the capture setting information and the lightness of the background region.

18. The image processing apparatus according to claim 17,
wherein the processor is configured to prepare the color conversion characteristics for each of the classified teacher data.

19. The image processing apparatus according to claim 1,
wherein the processor is configured to group sets of images before the color conversion and images after the color conversion using the capture setting information and the lightness of the background region, and prepare the color conversion characteristics for each group.

20. A non-transitory computer readable medium storing a program causing a computer to execute a process comprising:
inputting, to a learning unit, capture setting information that is used to capture an image before color conversion, a lightness of a background region of the image before the color conversion, and a set of images including the following: (1) the input image before the color conversion and (2) an output image generated after the color conversion on the input image; and
preparing color conversion characteristics for performing color conversion on a first image using color conversion characteristics saved in the learning unit that corresponds to both (1) capture setting information set for the first image and (2) lightness of a background region of the first image.

* * * * *